(12) United States Patent
Dunning et al.

(10) Patent No.: US 6,813,926 B2
(45) Date of Patent: Nov. 9, 2004

(54) MEASUREMENT OF SURFACE WEAR

(75) Inventors: Kenneth Dunning, Chapel-en-le-Frith (GB); Ronald Ian Cotterill, Chapel-en-le-Frith (GB); David Michael Lomas, Disley (GB)

(73) Assignee: Federal-Mogul Friction Products Limited, Manchester (GB)

( * ) Notice: Subject to any disclaimer, the term of this patent is extended or adjusted under 35 U.S.C. 154(b) by 40 days.

(21) Appl. No.: 10/344,175
(22) PCT Filed: Jul. 31, 2001
(86) PCT No.: PCT/GB01/03424
§ 371 (c)(1),
(2), (4) Date: Feb. 6, 2003
(87) PCT Pub. No.: WO02/12822
PCT Pub. Date: Feb. 14, 2002

(65) Prior Publication Data
US 2004/0112116 A1 Jun. 17, 2004

(30) Foreign Application Priority Data
Aug. 8, 2000 (GB) .............................. 0019293

(51) Int. Cl.⁷ ................................. G01N 3/56
(52) U.S. Cl. ............................................ 73/7
(58) Field of Search ....................... 73/7, 8, 104, 105

(56) References Cited
U.S. PATENT DOCUMENTS

| | | | |
|---|---|---|---|
| 4,762,742 A | * 8/1988 | Sonoda et al. | 428/141 |
| 4,856,199 A | 8/1989 | Merrill et al. | |
| 5,199,176 A | 4/1993 | Theurer et al. | |
| 5,885,690 A | * 3/1999 | Sada | 428/141 |
| 6,293,139 B1 | * 9/2001 | Keller et al. | 73/105 |
| 6,645,052 B2 | * 11/2003 | Jensen et al. | 451/41 |

FOREIGN PATENT DOCUMENTS

| | | |
|---|---|---|
| EP | 0503245 A1 | 1/1992 |
| EP | 0704639 A1 | 8/1995 |
| GB | 2329712 A | 3/1999 |
| WO | WO 99 17072 | 4/1999 |

* cited by examiner

Primary Examiner—Charles D. Garber
(74) Attorney, Agent, or Firm—Reising, Ethington, Barnes, Kisselle, P.C.

(57) ABSTRACT

Wear of a rubbing member of a friction couple, such as an iron brake disc (15), which is subject to slow wear by frictional engagement by brake pads (17), is determined by attaching a carrier member (25) of wear determining arrangement (24) to the rubbing surface of the disc by electromagnet (28) and causing a transducer (33), such as magnetic displacement sensor having probe (33/2), to s an across the surface along a track (48). After an initial scan to map the surface the carrier is removed and re-attached after a period of brake usage, whereupon the surface is scanned again and wear assessed. The carrier is provided with feet (26/1) and biassed by a resilient electromagnet mount against the surface. If the surface to which the carrier is attached is subject to wear a re-attached carrier is unable to provide a reference for the transducer signals and an alignment template (46) is used to provide both location recesses for re-locating the carrier to scan along the track and datum recesses (52/1), through which the transducer probe is scanned, having flat floor regions (62) that are no subject to wear and define a datum plane (88) relative to which all transducer signals can be referred. To facilitate ease of use, the location recesses by removal of the alignment template and the template may be coupled to the carrier member for attachment to the surface together before the template is removed.

12 Claims, 3 Drawing Sheets

MEASUREMENT OF SURFACE WEAR

BACKGROUND OF THE INVENTION

This invention relates to the determination of wear of a surface of a body and in particular relates to wear of a rubbing or frictional engagement surface of a friction couple such as a brake or clutch for a vehicle or like machine.

A friction couple is defined, for the purpose of this specification, as comprising a rubbing member having a rubbing surface and a friction material member capable of coupled motion relative to the rubbing surface when pressed into frictional engagement therewith substantially normally to the direction of said coupled motion such that a frictional engagement region extends along, and transversely to, said coupled motion direction.

An arrangement for measuring wear in a rubbing surface of a friction couple is described in WO9/17072 and the contents thereof are incorporated herein by reference. However, to facilitate a clearer understanding of the invention with regard to the friction coupling and rubbing surface, FIGS. 1(a) and 1(b) of that application are reproduced here as FIGS. 1(a) and 1(b) respectively. Referring to FIGS. 1(a) and 1(b) a wheel 10 for a rail vehicle comprises an axle 11 that defines a rotation axis 12 and a rim 13 spaced therefrom by radially extending spokes 14. The spokes are faced, on at least one axial facing side thereof, by a flat annular brake disc 15 of cast iron or steel having surface 16 against which brake pads 17 of friction material can be pressed by respective pivoted levers 18 to effect braking in conventional manner. The brake disc and pads comprise a friction couple of which the disc 15 is a rubbing member, having rubbing surface 16, and each pad 17 comprises a friction material capable of coupled motion relative to the rubbing surface, by virtue of rotational motion of the latter, when pressed into frictional engagement substantially normally to the direction of coupled motion, defining a frictional engagement region 19 of the rubbing surface which extends along, and transversely to, the coupled motion direction, that is, the swept area of the brake disc. The frictional engagement region may extend for the full radial width of the disc or less than the full width, as indicated by margins 19'.

It will be appreciated that in operation and as a result of successive braking operations on the vehicle, the components of the friction couple will wear. The rubbing surface of the disc, within the frictional engagement region 19 will normally wear to a much lesser extent than the friction material of the pads and any wear that does occur will normally be uniform in the direction of the coupled motion, that is, in the circumferential direction along the frictional engagement region, but may vary across the regions in a direction inclined to the coupled motion direction due to variations in the properties of, and/or braking forces exerted on, the pads of friction material.

From FIG. 1(b) it will be seen that insofar as wear is substantially uniform in the circumferential direction of coupled motion, then wear across the rubbing surface may be measured at any inclination to the coupled motion direction and not just transversely thereto (radially). It will be appreciated that if the surface wear is mapped in a truly radial direction then it will be of little consequence if successive measurements are made at different circumferential positions, for example radial paths 20 and 21, whereas if an initial mapping measurement is made along a chord 22 defined between arbitrary points x—x then subsequent measurements will need to be made along the same chord or sufficiently closely thereto to be correlated with the first measurement.

It will be seen from FIG. 1(a) that in a typical situation in which rubbing surface wear is to be measured, the rubbing surface is not only vertically orientated but also there is limited access for placing, as well as aligning, any measuring arrangement.

There is described in the aforementioned publication an arrangement particularly suited for measuring wear in such a rubbing surface of a railway vehicle disc brake, the arrangement including a transducer having a probe, a transducer carrier member to support it such that the probe interfaces with the rubbing surface and to scan the probe across the rubbing surface 16 along a track, such as that 22, and non-wearing lands defined in the margins 19' beyond the frictional engagement region, and releasable attachment means to permit the carrier member to be positioned periodically with respect to the same part of the rubbing surface to monitor long term wear by way of the scanned transducer probe. The margin lands, which may be referred to as datum lands, define a datum plane relative to which the frictional engagement region of the rubbing surface wears. The transducer carrier is supported on such lands and scanning means define a temporary scan plane offset from the datum plane so that the transducer signals derived from scanning the lands and the frictional engagement region between the lands, representing distance of the probe-surface interface from the temporary scan plane, can be referred to the datum plane of the unworn rubbing surface.

Because of the nature of the rubbing surface, and in practice the difficulty of unimpeded access to it, the described arrangement includes an alignment template fordisposition against the rubbing surface, initially to create a pair of location recesses in rubbing surface margins outside the frictional engagement region by which the template can be re-positioned on subsequent occasions, and to define by said positioning and re-positioning a scan track against which the arrangement carder can be positioned prior to removal of the template, leaving the transducer probe to scan along the track between limits of scan denoted by the recesses.

Such an arrangement is found to work satisfactorily where there is sufficient access for both alignmenttemplate and carrier member in side-by-side relationship and where a frictional engagement region of the rubbing area is contained between surface margins that define a datum plane in which said location recesses are effected and scan track defined. That is, in operation of the above described arrangement, each scan of the transducer probe encompasses a non-wearing surface land adjacent each location recess which land acts to define a reference or datum plane when the wearing frictional engagement region is scanned.

Thus notwithstanding any difficulty in repositioning the carrier member accurately, the ability to position it against such non-wearing margins of a rubbing surface and to refer transducer probe measurements to such a non-wearing datum permits signals derived at different times to be correlated and a wear pattern established.

However, there are situations when it is difficult to obtain repeatability of positioning and correlation of measurements, such as when the frictional engagement region extends for the full width of the surface and there are no non-wearing regions and for access is restricted. Even if the transducer carrier can be positioned such that the transducer probe scans along the same track, the transducer signals, which relate the instantaneous surface position to the temporary scan plane defined by attaching the transducercarrierto that surface, become less easy to correlate with those for other attachments of the carrier.

Also, when access to the rubbing surface is limited, the ability to separately attach both an alignment template and the carrier member relative thereto may be impaired. There is difficulty in ensuring that the transducer carrier and/or alignment template is re-positioned accurately if the surface wears unevenly, notwithstanding the inherent tolerances to positioning accuracy associated with the components and operating situation.

BRIEF SUMMARY OF THE INVENTION

It is an object of the present invention to provide a method of determining wear of a rubbing surface of a friction couple of the type hereinbefore defined that is less dependant on parts of the rubbing surface remaining unworn than previous methods, and to provide an arrangement for determining wear of a rubbing surface of such a friction couple. It is also an object of the present invention to provide a simplified locating template arrangement for attaching the carrier member to a rubbin g surface. According to a first aspect of the present invention a method of determining wear of a rubbing surface of a rubbing member of a friction couple, comprising said rubbing member and a friction material member capable of coupled motion relative to the rubbing surface when pressed into frictional engagement therewith substantially normally to the direction of said coupled motion, comprises the steps of (i) defining a track across the rubbing surface in a direction inclined with respect to the coupled motion direction, (ii) defining a datum plane substantially parallel to the rubbing surface including at least two regions spaced apart along the track direction, (iii) locating on the rubbing surface a carrier of a scanning transducer, having a probe operable to determine instantaneous distance of a probe tip from the carried transducer, such that the located transducer defines a temporary scan plane, (iv) scanning the transducer probe across the rubbing surface substantially along the track and deriving therefrom at a plurality of scan positions transducer signals relating instantaneous distance of the rubbing surface from the temporary scan plane, (v) scanning the transducer probe across the datum plane defining regions and from the transducer signals thereat relating the temporary scan plane to the datum plane, (vi) referring the transducer signals derived at said plurality of scan positions to the datum plane, (vii) removing the transducer carrier from the rubbing surface, (viii) subjecting the rubbing surface to wear, and (ix) repeating steps (iii) to (viii) and, for each repeated locating of the transducer carrier on the rubbing surface, comparing the referred transducer signals with referred transducer signals of at least one preceding locating of the carrier, and is characterised by forming the datum plane defining regions as floor regions of at least one datum recess in the rubbing surface and defining each said floor region extending transversely to the track direction by at least the locating accuracy of the transducer carrier.

According to a second aspect of the present invention an arrangement, for determining wear of a rubbing surface of a friction couple comprising said rubbing member and a friction material member capable of coupled motion relative to the rubbing surface when pressed into frictional engagement therewith substantially normally to the direction of said coupled motion, comprises (i) a transducer carrier member arranged to overlie a part of the frictional engagement region of the rubbing surface and including contact datum means adapted to bear on the rubbing surface, (ii) transducer means including transducer support means, arranged to support, with respect to the carrier member, a transducer having a probe with a surface interfacing tip and operable to provide signals related to the instantaneous distance of the frictional engagement region of the rubbing surface from the transducer support means and scanning means operable to effect production of said transducer signals with respect to a plurality of different scan positions of the probe across the rubbing surface in a direction inclined with respect to said coupled motion direction, (iii) locating means including attachment means adapted to engage releasably with the rubbing member and support the carrier member overlying said rubbing surface of said rubbing member, the carried transducer means defining a temporary scan plane, and alignment means comprising an alignment template, arranged to be positioned relative to the rubbing surface to define a predetermined track thereacross to be scanned by the transducer probe, and including positioning means operable to create or occupy at least one locating recess in the rubbing surface to facilitate, for each separate engagement of the attachment means to the rubbing member, substantial alignment of the transducer probe scan positions with the track, and (iv) signal processing means operable to produce from said transducer signals at different positions along said predetermined track an indication of the variation of distance of the rubbing surface from the temporary scan plane and, for separate attachments of said attachment means to the rubbing member, variation of wear to the rubbing surface along said predetermined track in the time interval between said attachments, and is characterised by the alignment template being arranged, with the alignment template operably positioned relative to the rubbing surface, to create in the rubbing surface at least one locating recess as a datum recess having a floor region to be scanned by the transducer probe, the locus of datum recess floor regions at a plurality of scan positions defining a datum plane, and said signal processing means being operable to determine from the transducer signals characteristic of the probe scanning said datum recess floor regions displacement of the temporary scan plane from said datum plane to permit the transducer signals obtained from the rubbing surface at said plurality of positions throughout the scan to be referred to the datum plane and comparison of transducer signals, referred to the datum plane, with corresponding transducer signals, referred to the datum plane, from a separate attachment of the carrier to the rubbing surface.

According to a third aspect of the present invention an arrangement, for determining wear of a rubbing surface of a friction couple comprising said rubbing member and a friction material membercapable of coupled motion relative to the rubbing surface when pressed into frictional engagement therewith substantially normally to the direction of said coupled motion, comprises (i) a transducer carrier member arranged to overlie a part of the rubbing surface and including contact datum means adapted to bear on the rubbing surface, (ii) transducer means including transducer support means, arranged to support, with respect to the carrier member, a transducer having a probe with a surface interfacing tip and operable to provide signals related to the instantaneous distance of the frictional engagement region of the rubbing surface from the transducer support means and scanning means operable to effect production of said transducer signals with respect to a plurality of different scan positions of the probe across the rubbing surface in a direction inclined with respect to said coupled motion direction, (iii) locating means including attachment means adapted to engage releasably with the rubbing member and support the carrier member overlying said rubbing surface of said rubbing member, the carried transducer means defining a temporary scan plane, and alignment means comprising an alignment template, arranged to be positioned relative to the rubbing surface to define a predetermined track thereacross to be scanned by the transducer probe, and including positioning means operable to create or occupy at least one locating recess in the rubbing surface to facilitate, for each separate engagement of the attachment means to the rubbing member, substantial alignment of the transducer probe scan positions with the track, and (iv) signal processing means operable to produce from said transducer signals at different positions along said predetermined track an indication of the variation of distance of the rubbing surface from the temporary scan plane and, for separate attachments of said attachment means to the rubbing member, variation of wear to the rubbing surface along said predetermined track in the time interval between said attachments, and is characterised by the alignment template positioning means including releasable clamping means operable to effect clamping of the alignment template to the transducer carrier member to permit positioning with respect to the rubbing surface together, support of the alignment template in position relative to said rubbing surface by way of the attachment means and subsequent removal of the alignment template from the attached transducer carrier.

BRIEF DESCRIPTION OF THE SEVERAL VIEWS OF THE DRAWING

The inventive features will now be described with reference to the accompanying drawings, in which.

DETAILED DESCRIPTION OF THE INVENTION

Figure 1A:
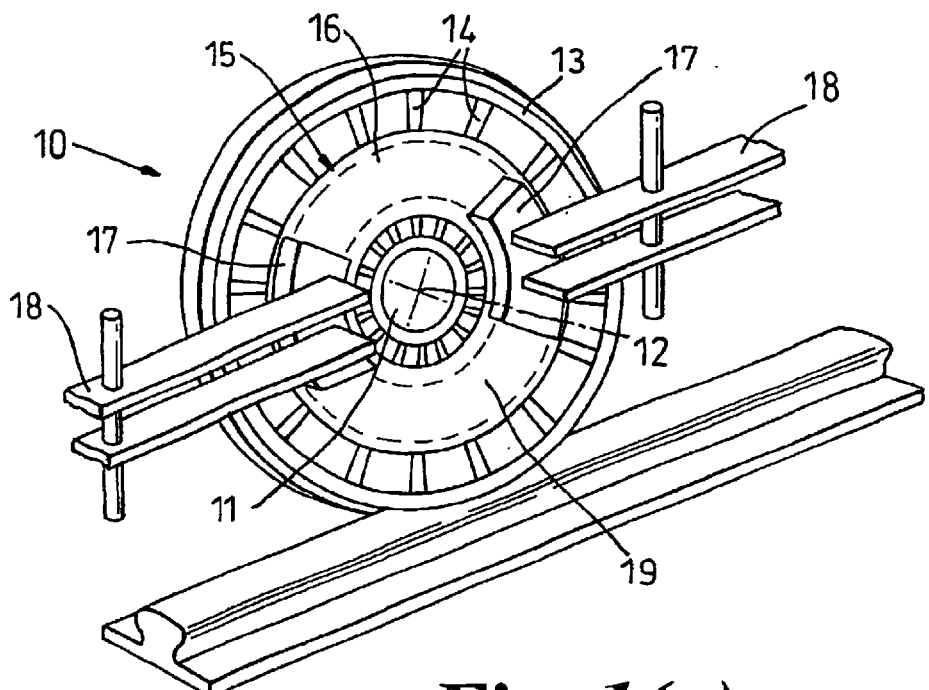
FIG. 1(a) is a perspective view of a wheel of a rail vehicle showing in part a disc brake arrangement therefor comprising a ventilated disc and pads of friction material arranged to be pressed against a rubbing surface of the disc by pivoted levers, the disc rotating relative to the pads in a coupled direction and where they contact sweeping out a frictional engagement region of the rubbing surface of the disc.
Figure 1B:
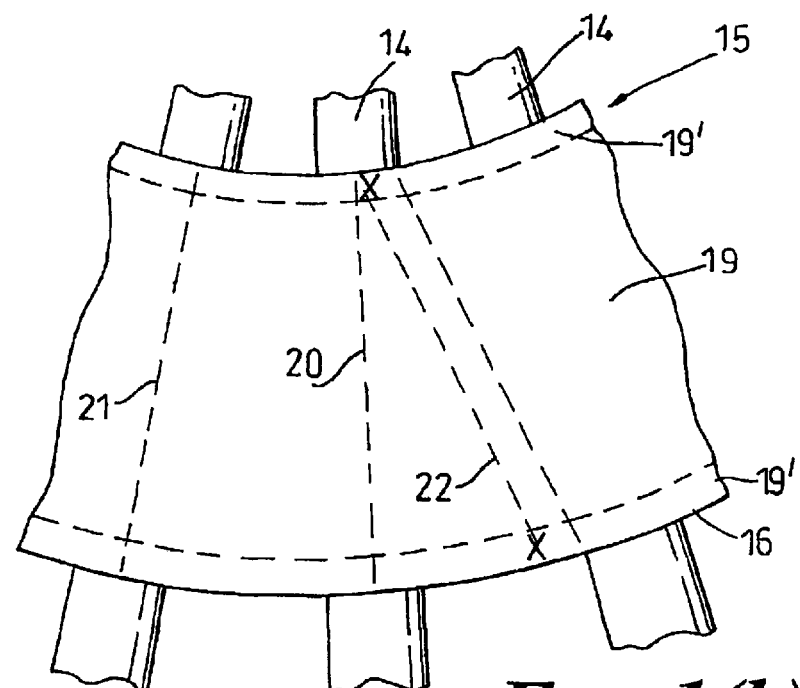
FIG. 1(b) is a front view of part of the wheel of FIG. 1(a) showing the rubbing surface and extent of frictional engagement region to illustrate scanning across the region in order to determine wear to it resulting from the frictional engagement of braking.
Figure 2:
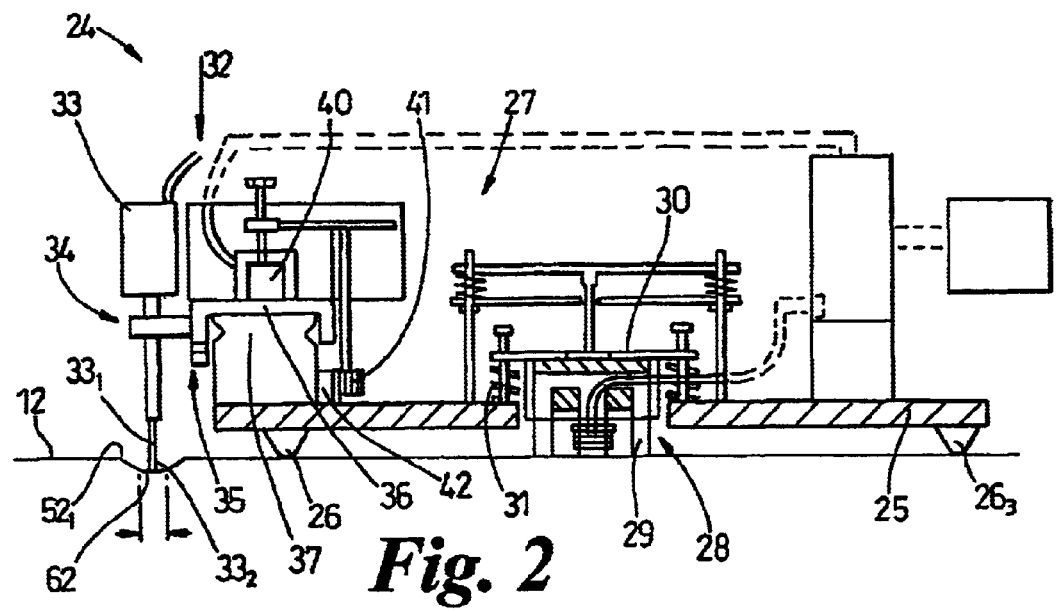
FIG. 2 is a sectional elevation through a wear determining arrangement according to the invention, showing a carrier member magnetically clamped to a ferromagnetic rubbing member and carrying transducer means including a contact making probe arranged to scan across the surface and through a shallow walled, flat-bottomed datum recess in the rubbing surface.
Figure 3:
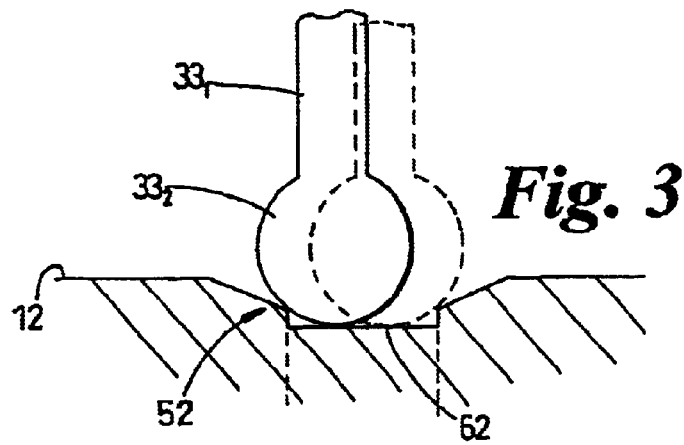
FIG. 3 is an enlarged sectional elevation through the datum recess of FIG. 2.

Referring to FIGS. 2 to 6, a wear determining arrangement 24 is arranged to be disposed overlying a ferromagnetic rubbing surface 12 of a friction couple, specifically a brake disc of a railway vehicle wheel of significant diameter. The situation differs from that detailed in the aforementioned WO 99/17072 in that the frictional engagement areas comprises all of the rubbing surface, that is, margins 19' shown in FIG. 1(b) are absent.

The arrangement 24 comprises a transducer carrier member 25 arranged to be disposed overlying the rubbing surface 12 on feet 261, 262 and 263 which bear on the rubbing surface and effect contact datum means by which each part of the carrier is referenced positionally with respect to the rubbing surface. Locating means, indicated generally at 27, is arranged to locate the carrier member with respect to the rubbing surface, and includes electro-magnetic attachment means 28 by which the carrier member 25 is supported on the rubbing surface. The electromagnetic attachment means 28 has a core 29 which is resiliently mounted with respect to housing means 30 carried by the carrier member, and which housing means is biassed away from the surface by attachment bias springs 31 such that when the electromagnet is attached to the surface, having overridden such bias, the bias then acts to force the carrier into firmer contact with the rubbing surface.

Transducer means, indicated generally at 32, includes transducer 33, transducer support means 34 which is arranged to support the transducerwith respect to the carrier member, and scanning means 35. The transducer 33 comprises an inductive displacement sensor, such as a LVDT transducer type DG2.5 produced by Solarton Limited, England and available as Radiospares (RS) stock no 646482, including a probe 33, that extends to a rounded tip 332 and has one degree of freedom in the direction of its length. The transducer support means 34 comprises carriage 36 mounted on a slide 37 extending between opposite ends of the carrier member and is arranged to support the transducer with respect to the carrier member such that the transducer probe interfaces with the rubbing surface adjacent the carrier member by way of the tip 332 and causes production of transducer signals related to instantaneous displacement of the probe tip from a limit position and thus the support means. The scanning means 35 comprises a stepping motor 40, pinion gear 41 and a rack 42 secured to the slide 37, to translate and reciprocate the carriage along the slide in accordance with supplied voltage pulses, that is, scan it through a plurality of positions with respect to the carrier member at each of which transducer signals are produced. The supplied pulses thus not only define, and move the carriage to, any instantaneous position but are also representative of that instantaneous position within the scan. Furthermore, when the carrier member is disposed attached to the rubbing surface, the carried transducer, by any part thereof other than the probe, or the supporting means, defines a temporary scan plane relative to which the transducer signals represent the instantaneous distance of the rubbing surface.

The locating means 18 furthermore includes alignment means indicated generally at 45, comprising an alignment template 46, arranged to be positioned relative to the rubbing surface to define a predetermined track 48 thereacross to be scanned by the transducer probe, also referred to as the scan track, and positioning means, indicated generally at 50, operable to create or occupy at least one, and here two, locating recesses 52, and 522 in the rubbing surface to facilitate, for each separate attachment of the carrier member to the rubbing member, substantial alignment of the transducer probe scan positions with the track 48. In this embodiment the locating recesses 52, and 522 are spaced apart and define by their locus across the rubbing surface, scan track 48.

Functioning of the arrangement depends upon the existence along the scanning track of datum recesses as described below, and conveniently the locating recesses are also created as datum recesses.

Furthermore, the datum/locating recesses are created by the alignment template which thereafter employs them to re-position it and the carrier memberwith respect to the track 48. They are created with the alignment template attached overlying the rubbing surface.

Guide aperture means 54 comprises two spaced apart threaded through-apertures $56_1$ and $56_2$. As is shown for aperture 561 a hollow guide 58 is disposed therein to overlie the rubbing surface. Recess creabng means, comprising a round nosed first punch $59_1$, is inserted into the guide and struck to impress into the rubbing surface a shallow walled, convergent recess $55_2$, followed by second punch $59_2$ having a smaller diameter, flat end which is struck to effect a flat floor region 62 in the recess, the cumulative effect being clearly seen from FIG. 2 and achieved without removing metal from, and potentially weakening, the rubbing member. A similar guide is employed in aperture 562 to impress an identical recess.

After formation of each such flat floored recess, each guide may be replaced by, or hold, a positioning member 64 conforming generally to the convergent shape of the recess and permits the alignment template to be re-positioned in substantially the same position on the rubbing surface by locating the positioning members in the recesses. Whereas it may appear desirable for the positioning members to fit the recesses (as locating recesses) precisely, in practice, the weight of the arrangement and/or disposition of the rubbing surface may prevent handling of the arrangement with such accuracy as is necessary to enable the positioning members to align with the locating recesses. Accordingly, it is preferred to create the locating recesses of somewhat larger cross section to facilitate practicable alignment, and notwithstanding that this in turn defines a scan track 48 that has a corresponding width in the coupled motion direction.

In operation, described more fully hereafter, the transducer probe is caused by the scanning means to traverse the rubbing surface one or more times along scan track 48 and insofar as the recesses are spaced apart therealong, it traverses the recesses. As seen from the enlarged sectional elevation of the recess $52_1$ shown in FIG. 2, the wall is inclined with a slope or curvature that in relation to the probe tip $33_2$ does not impede the scanning motion of the probe. Furthermore, the floor region 62 of each recess extends, at least in a direction perpendicular to the scanning track direction, wider than needed to accommodate the probe tip by a corresponding amount that accommodates template positioning tolerance in the coupled motion direction. To ensure that the transducer probe crosses the floor region of the recess the region is made larger than the transducer probe tip by an amount which will accommodate the probe tip and any positioning errors. It has been found that having the floor region as a circle of approximately the same diameter as the probe tip provides this.

Functioning of the arrangement depends not only upon the initial formation of the recesses $52_1$ and $52_2$ as locating recesses but also the ability to position the carrier member such that the transducer probe scans between, and in this case through, the recesses as datum recesses on separate occasions to determine the occurrence of wear of the rubbing surface over a period.

The alignment template is positioned with respect to the rubbing surface with the carrier member. Releasable clamping means, indicated at 66, is operable to effect clamping of the alignment template 46 to the transducer carrier member 25 to permit positioning with respect to the rubbing surface together, support of the alignment template in position relative to said rubbing surface by way of the attachment means 28 and subsequent removal of the alignment template from the attached transducer carrier.

The releasable clamping means 66 comprises alignment template mounting means 68, operable to mount the template with respect to the carrier member to permit movement relative thereto in one direction perpendicular to the direction of transducer scan, taking the form of pins 70 which extend from or through the alignment template and mounting holes 72 in the slide 37 for receiving the pins. It also comprises locking means 74, comprising at least one tapered locking surface 76, 78 tapered in the direction of transducer scan and defined on at least one, and preferably both, of the transducer support means 34 and alignment template 46 such that translation of the transducer support means effects clamping and unclamping of the alignment template with respect to movement in said one direction relative to the carrier member. Most conveniently, the tapered locking surface 76 is provided on the carriage 36 which is keyed to slide 37, and the alignment template is readily disposed in accurate relationship with the carrier member and clamped thereto or released by simple translation movement of the transducer support means.

To create the recesses $52_1$ and $52_2$, the alignment template is clamped with respect to the carrier member and the latter is releasably attached to the rubbing surface by attaching the mutually clamped carrier member 25 by attachment means 28 of the location means, whereupon the recesses are created in the attached alignment template by way of guide members as described above.

Insofar as the carrier member is in place attached to the rubbing member, the alignment template may be unclamped and removed therefrom, thereby exposing the estwhile locating recesses 52, and 522 as datum recesses. If the transducer 33 is not already in position, it is mounted with respect to the carriage 36 such that its probe tip 332 contacts the rubbing surface.

The scanning means causes the transducer probe to scan the rubbing surface along the track defined by, and including, the datum recesses 52, and 522. The transducer produces signals which are fed to signal processing means, indicated generally at 80, conveniently formed by a general purpose computer programmed to supply the stepping motor 40 to effect scanning of the carriage 36 across the rubbing surface and effect interpretation of the signals produced by the transducer. The signal processing means may, in the main part, be separate from the carrier member, but conveniently the latter carries at least analogue-to-digital conversion (ADC) means to convert the analogue signals of the transducer to digital form and suitable for transfer for remote processing. The signal processing means also includes indication means 82, such as a plotter or electronic visual display unit, for providing output in graphical form related to scanning the rubbing surface and/or means for giving a numerical output.

The carrier member is detached from the rubbing surface to permit an interval of wear to occur.

When further surface measurements are required, the alignment template is clamped in relation to the carrier member 25 by way of the clamping means 66 and the carrier member offered up to the rubbing surface and manipulated until the template positioning members locate within the recesses 52, and 522, whereupon the magnetic attachment means 28 is energised to clamp the carrier member in substantially the same position it previously occupied on the rubbing surface. Thereafter, the alignment template is unclamped and dismounted from the carrier member, exposing the datum recesses 52, and 522 to permit scanning of the surface by the transducer probe, which scanning includes traversing the datum recesses and particularly the suitably dimensioned floor regions thereof, notwithstanding that the rubbing surface around the recesses and upon which the carrier member and transducer body are supported, has also been subject to wear.

Figure 6:
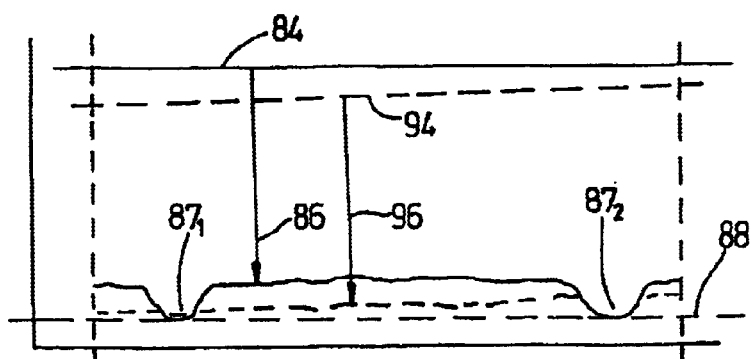
FIG. 6 is a graphical representation of transfer signals output from signal processing means of the arrangement, illustrating the manifestation of surface wear as a function of scanned transducer position.
Figure 4:
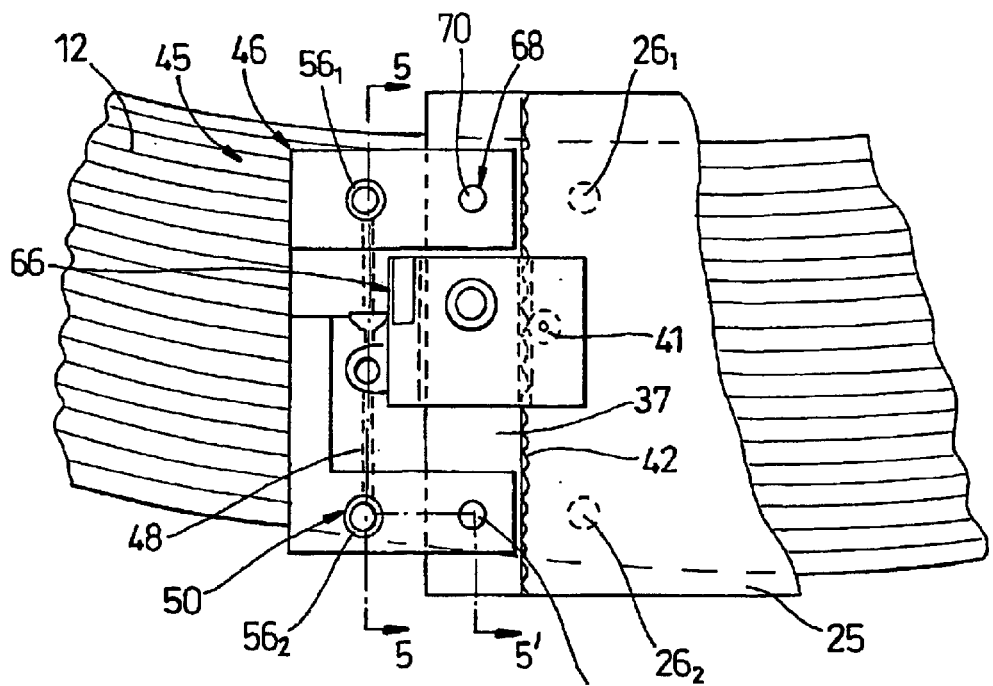
FIG. 4 is a plan view of a part of the arrangement of FIG. 2 at a different point in operation, showing an alignment template clamped to the carrier member for the purpose of locating the latter with respect to the recesses.
Figure 5:
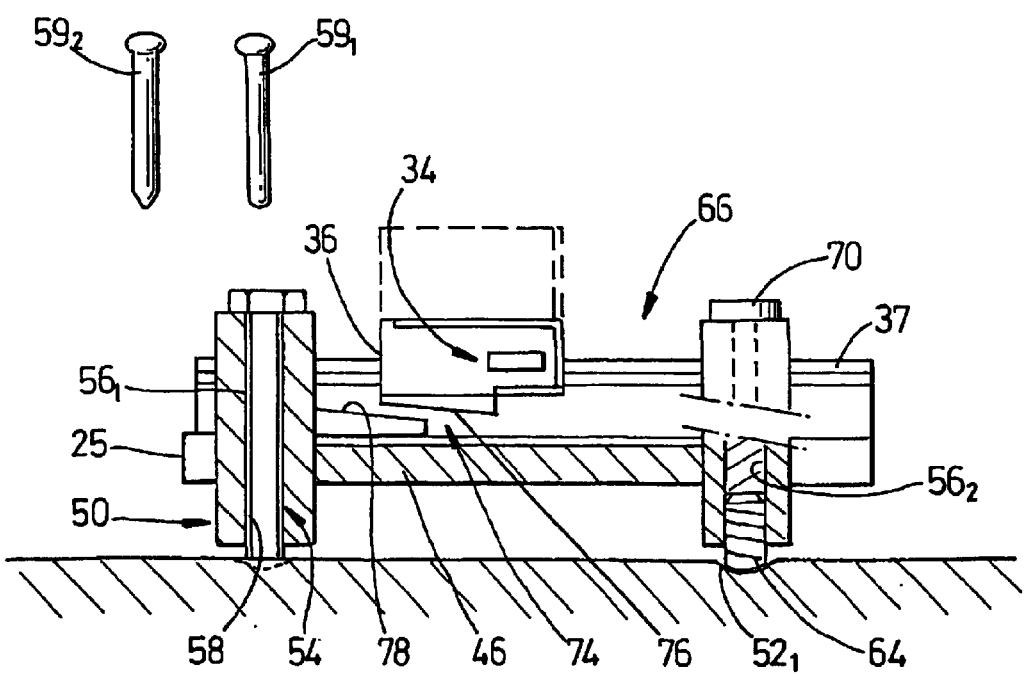
FIG. 5 is a sectional elevation along the lines 5—5 and 5—5' of FIG. 4, illustrating the clamping of the alignment template with respect to the carrier member and creation of, and relocation with respect to, the shallow walled datum recesses in the rubbing surface.

The method by which the above described arrangement operates in accordance with the present invention will be described with reference to FIG. 6 which illustrates graphically by full and broken lines the representations of transducer signals received by scanning the rubbing surface at earlier and later times respectively.

As described above, when the transducer carrier member is attached to the rubbing surface, the transducer carrier or equivalent part defines a temporary scan plan 84 displaced from the actual rubbing surface. During the earlier scan (or average of multiple scans) of the transducer probe signals of level 86 are generated related to the offset of the probe tip 332 from the carriage and this the temporary scan datum, which signal includes characteristic dips $87_1$ and $87_2$ resulting from scanning through the spaced apart datum recesses $52_1$ and $52_2$.

The floor regions 62 of the datum recess define by their locus (in the direction of rubbing member thickness) a datum plane 88.

The transducer signals resulting from scanning through the datum recesses, and particularly the floor region thereof are characteristic and readily identified with respect to the transducer signals of the remainder of the scan, either visually or numerically by an operative of the processing means, as at $87_1$ and $87_2$. Therefore the transducer signal 86 can be referred to the datum plane 88 which is fixed with respect to the rubbing member by the dimensions of the datum recesses therein and independent of the temporary disposition of the transducer carrier member.

After a period of rubbing surface wear, when the transducer carrier member is next attached to the rubbing surface, it defines a later temporary scan plane 94 and relative to which transducer signals of level 96 are produced at the plurality of probe scan positions.

The datum recesses $52_1$ and $52_2$ still define the datum plane 88 and datum signals characteristic thereof.

Thus, as shown in the Figure, the transducer signals 86 and 96 may be referred to the datum plane 88 and compared, as a function of the positions along the scan track to derive a indication of the form and quantity of rubbing surface wear.

In the particular example illustrated by FIG. 6, it will be appreciated that the rubbing surface has worn unevenly along the scan track, that is, generally radially with respect to the disc, with the result that the transducer carrier, supported by the worn rubbing surface, produces a later transducer signal envelope 96 which is substantially uniform in relation to the temporary scan plane 94 defined by the transducer carrier, but potentially misleading unless referred to the datum plane defined by the datum recess floor regions protected from wear. It will be appreciated from the above that provided the transducer probe scans datum recess floor regions which are spaced apart in the direction of scan, that is, produces characteristic transducer signals at different scan positions, the floor regions may be defined at any part of the rubbing surface, whether within a frictional engagement regions subject to wear or not.

Similarly, although it is most convenient to define the datum plane by datum recess floor regions in different recesses spaced apart along the scan track, it may be defined by spaced apart regions of a floor within a single, extensive datum recess if the nature of the rubbing surface is appropriate. Conversely, there is no upper limit on the number of datum recesses employed along the scan track and the number of characteristic floor regions contributing to defining the datum plane.

Insofar as the datum plane is defined by the locus of the floor regions, it is not necessary for each floor regions to lie in the datum plane, but results may be of higher accuracy if this is the case.

It will be seen that the datum recesses 52, and 522 are relatively shallow in total depth, due both to the manner of formation and the need to scan the probe therethrough. If, after a period of surface wear, it is found that a datum recess is becoming too shallow, the initial impressing may be repeated by deepening the existing recess alternatively, a fresh recess, preferably in a pair, may be defined nearby on a different part of the rubbing surface and measurements taken along tracks between each pair of datum recesses with no wear interval, in order to derive a datum plane representation with which to correlate future wear signals.

It will also be appreciated that the floor region may be impressed into each datum recess other than by way of a guide in the alignment template, possibly by being impressed after the template is removed after formation of the initial convergent recess which defines the floor to be flattened. Furthermore, if there is no objecton to removal of metal from the rubbing surface, any datum recess may be formed by drilling or other machining operation.

The above described arrangement 24 employs recesses 52, and 522 which provide both datum recesses and locating recesses. It will be appreciated that separate recesses may be provided for each function; most usefully, such a separate configuration permits the locating recesses to be displaced from the scan track and thus the space required for the transducer, so that after creation of the datum recesses, the transducer can be disposed relative to an alignment template without concern for positional conflicts with a transducer or transducer probe thereof.

Also, although the arrangement 24 described employs clamping of the alignment template and transducer carrier together for mutual positioning with respect to the rubbing surface the alignment template may be separately positioned priorto the transducer carrier member being disposed in alignment therewith if provision is made for releasable attachment of the alignment template to the rubbing member, irrespective of the use of common or separate datum and locating recesses.

If the datum recesses are not used as locating recesses, it will be appreciated that by creation of by the alignment template datum and locating recesses spaced apart by the same relationship that exists between the transducer carrier feet 26, and 262 and the supported transducer probe 33 the transducer carrier 25 may thereafter be re-located with respect to the rubbing surface without the template by direct positioning of the feet within the locating recesses.

As mentioned above the friction couple may be other than a disc brake, a brake for a vehicle, or even brake per se, such as a drum brake or dry-plate clutch wherein the rubbing member and its surface comprise a driving or driven annular plate or drum of such clutch arrangement.

Whereas some of the above embodiments and variants thereof have been described with respect to a rubbing surface which is orientated in a vertical or near vertical plane, it may, of course be employed with such surfaces disposed in different orientations, for example if a wheel is removed from a vehicle.

Furthermore the transducer means may take a variety of different forms that are capable of measuring distance to the rubbing surface; for instance instead of having a physical probe with a tip that contacts the surface, such transducer may have a virtual probe formed by a beam of ultrasonic or electromagnetic radiation.

Likewise the scanning means may be arranged to produce other than a rectilinear scan by translation of the transducer and its probe; scanning means may for example, sweep the transducer probe along an arcuate path or, if the transducer means has a virtual probe formed by a beam of radiation, the scanning means may be arranged with or without moving parts, as appropriate, to scan the beam without translating the whole transducer.

It will be appreciated that although the alignment template has been described with reference to deriving datum recesses in the path of the transducer probe, the means by which the template is releasably clamped with respect to the carrier member to facilitate positioning of the latter may be employed when the datum recesses are outside of the scanned track and serve only as track defining markers as in the above referenced WO 99/17072

What is claimed is:

1. A method of determining wear of a rubbing surface of a rubbing member of a friction couple comprising said rubbing member and a friction material member capable of coupled motion relative to the rubbing surface when pressed into frictional engagement therewith substantially normally to the direction of said coupled motion such that a frictional engagement region extends along, and transversely to, said coupled motion direction, the method comprising:
   (i) defining a track across the rubbing surface in a direction inclined with respect to the coupled motion direction,
   (ii) locating on the rubbing surface a carrier of a scanning transducer, having a probe operable to determine instantaneous distance of a probe tip from the carried transducer, such that the located transducer defines a temporary scan plane,
   (iii) forming at least one datum recess in the rubbing surface, each having a floor region extending transversely to the track direction by at least the locating accuracy of the transducer carrier, defining by at least one floor region a datum plane substantially parallel to the rubbing surface including at least two datum regions spaced apart along the track direction,
   (iv) scanning the transducer probe across the rubbing surface substantially along the track and deriving therefrom at a plurality of scan positions transducer signals relating instantaneous distance of the rubbing surface from the temporary scan plane,
   (v) scanning the transducer probe across the datum recess datum regions and from the transducer signals thereat relating the temporary scan plane to the datum plane,
   (vi) referring the transducer signals derived at said plurality of scan positions to the datum plane,
   (vii) removing the transducer carrier from the rubbing surface,
   (viii) subjecting the rubbing surface to wear, and
   (ix) repeating steps (ii) and (iv) to (viii) and, for each repeated locating of the transducer carrier on the rubbing surface, comparing the referred transducer signals with referred transducer signals of at least one preceding locating of the carrier.

2. A method as claimed in claim 1 comprising forming each said datum recess between the ends of the track and deriving transducer signals from the rubbing surface from scan positions to each side of each said recess.

3. A method as claimed in claim 1 comprising defining the floor region of each datum recess substantially flat.

4. A method as claimed in claim 1 comprising defining the datum plane by the locus of the floor regions of at least two datum recesses spaced apart along the track.

5. A method as claimed in claim 4 comprising defining the floor regions of said datum recesses substantially coplanar.

6. A method as claimed in claim 4 comprising defining the track by the locus of said datum recess positions on the rubbing surface.

7. A method as claimed in claim 1 comprising providing the transducer with a probe that has a tip which abuts the rubbing surface and defining each datum recess with a sloping wall that does not impede scanning motion of the probe tip and defining said datum recess floor regions larger in extent than the probe tip.

8. A method as claimed in claim 1 comprising impressing each datum recess in the rubbing surface without removing metal from the rubbing member.

9. A method as claimed in claim 8 comprising further impressing a datum recess in the same location as an existing datum recess and correlating transducer signals taken scanning the datum recess without intervening exposure to wear to define a new datum plane.

10. A method as claimed in claim 1 comprising defining each datum recess by way of an alignment template removably secured to the rubbing member and subsequently locating the alignment template with respect to the datum recess or recesses and disposing the transducer carrier with respect to the alignment template to effect location of the transducer carrier with respect to said track and definition of said temporary scan plane in relation to the datum plane.

11. A method as claimed in claim 10 comprising clamping the alignment template and transducer carrier member together and locating them with respect to the datum recess or recesses together to locate the transducer carrier and thereafter removing the alignment template.

12. A method as claimed in claim 1 comprising providing the transducer carrier with a plurality of locating features operable to bear on the rubbing surface and having a predetermined relationship with the transducer probe scan path, securing an alignment template to the rubbing member, defining by way of the alignment template each said datum recess and a plurality of carrier locating recesses having positional relationships corresponding to the relationship between the transducer probe scan path and carrier locating features, removing the alignment template and subsequently locating the transducer carrier with respect to the rubbing surface by engagement of said carrier location recesses and location features.

* * * * *